United States Patent
Kawamoto

(10) Patent No.: US 8,750,844 B2
(45) Date of Patent: Jun. 10, 2014

(54) RADIO TRANSMISSION DEVICE

(71) Applicant: Oki Electric Industry Co., Ltd., Tokyo (JP)

(72) Inventor: Yasutaka Kawamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 13/788,608

(22) Filed: Mar. 7, 2013

(65) Prior Publication Data

US 2013/0244597 A1 Sep. 19, 2013

(30) Foreign Application Priority Data

Mar. 13, 2012 (JP) .................. 2012-055967

(51) Int. Cl.
*H04B 1/02* (2006.01)
(52) U.S. Cl.
CPC ...................................... *H04B 1/02* (2013.01)
USPC ..................................................... 455/414.1
(58) Field of Classification Search
CPC ........................................................ H04B 1/02
USPC ............................................................ 455/91
See application file for complete search history.

(56) References Cited

U.S. PATENT DOCUMENTS

| | | | | |
|---|---|---|---|---|
| 6,728,233 | B1 * | 4/2004 | Park et al. | 370/342 |
| 6,952,595 | B2 * | 10/2005 | Ikedo et al. | 455/553.1 |
| 2003/0072257 | A1 * | 4/2003 | Ikedo et al. | 370/208 |

OTHER PUBLICATIONS

ARIB STD-T108, "920Mhz-Band Telemeter, Teleconcontrol and Data Transmission Radio Equipment", ARIB Standard, Feb. 14, 2012.

* cited by examiner

*Primary Examiner* — Creighton Smith
(74) *Attorney, Agent, or Firm* — Rabin & Berdo, P.C.

(57) ABSTRACT

A radio transmission device may comprise a stop condition assessment module and a stop reason reporting module. The stop condition assessment module may be configured to, in response to an occurrence of a transmission stop condition, determine at least a type of the transmission stop condition. The stop reason reporting module may be configured to send information relating to the transmission stop condition to an upper layer processing module.

12 Claims, 3 Drawing Sheets

RADIO TRANSMISSION DEVICE

CROSS-REFERENCE TO RELATED APPLICATION

This application claims priority under 35 U.S.C. §119 from Japanese Patent Application No. P 2012-055967, filed on Mar. 13, 2012, the disclosure of which is incorporated herein by reference.

BACKGROUND

1. Technical Field

This application relates to the art of radio transmission devices in MHz (megahertz) band (e.g. 920 MHz).

2. Description of Related Art

With regard to the 920 MHz frequency band in Japan, the standard "ARIB STD-T108" (February 2012) was laid down and disclosed as an "ARIB STANDARD" by the ARIB (Association of Radio Industries and Businesses).

Conditions of a transmission stop in the 920 MHz band may be described as shown below in (A) to (C). That is, in the 920 MHz band, if a transmission by a given transmitter meets any of conditions (A) to (C), the transmission may be stopped or inhibited (e.g., delayed).

(A) A cumulative transmission period (e.g., accumulated transmission time) per unit time (e.g. one hour) would exceed a predetermined limit (e.g., 360 seconds).

(B) A transmission of one frame takes longer than a predetermined time period (e.g. 3 ms [channel width is 400 kHz (kilohertz)], 2 ms [channel width is 600 kHz to 1000 kHz]) to complete. Here, the stopping may take the form of a fixed idle or wait period (e.g., 2 ms) that is required before the transmitter is permitted to transmit again.

(C) A continuous period of transmission would exceed a maximum permitted continuous transmission period. For example, if before completing transmissions of all frames that would be requested by a destination, the end of a predetermined continuous period (e.g. 200 ms [channel width is 400 kHz], 100 ms [channel width is 600 kHz to 1000 kHz]) of transmission is reached, further transmission may be stopped or inhibited.

A simplified structure of a related art radio transmission device that would operate according to conditions (A) to (C) is shown FIG. 3.

Referring to FIG. 3, a radio transmission device 100 in the related art may include a transmission frame interface module 101, a frame transmitting module 102 that sends transmission frames, a stop condition checking module 103, and an upper layer processing module 104. The transmission frame interface module 101 sends transmission frames to the upper layer processing module 104, or it receives transmission results from the upper layer processing module 104. The stop condition checking module 103 judges whether any of conditions (A) to (C) is met. The upper layer processing module 104 performs processes of an upper layer that includes the network layer and the application layer, and so on. The lower layer processing module 105 includes the transmission frame interface module 101, the frame transmitting module 102, and the stop condition checking module 103. The lower layer processing module 105 performs processes of a lower layer that has the MAC (Media Access Control) layer or the PHY (physical) layer. The MAC layer is generally called the data link layer.

A request for frames from the upper layer processing module 104 is transmitted to the frame transmitting module 102 via the transmission frame interface module 101. Then, the stop condition checking module 103 checks whether any of conditions (A) to (C) is met. If a condition is met, the stop condition checking module 103 instructs the frame transmitting module 102 to stop transmitting. The frame transmitting module 102 sends the frames according to the instruction from the stop condition checking module 103. That is, when there is no instruction to stop transmission from the stop condition checking module 103, the frame transmitting module 102 continues transmitting the frames. But, if there is an instruction to stop transmission from the stop condition checking module 103, the frame transmitting module 102 suspends transmitting the frames. The frame transmitting module 102 sends a transmission result to the upper layer processing module 104 via the transmission frame interface module 101.

One or all of the processes that are conducted by the lower layer processing module 105 in the MAC layer may be achieved by one or more computer programs (e.g., a MAC layer program). In this case, a MAC layer program of the lower layer processing module 105 generally returns a transmission error, if one of the conditions is met and transmission is stopped, to the upper layer processing module 104 without conducting transmission during the stopping of transmission.

However, the upper layer processing module 104 doesn't distinguish whether condition (A), condition (B) or condition (C) is the primary cause of transmission error. As a result, the upper layer processing module 104 treats them as the same error. This results in some problems, as described hereinafter.

When the primary cause of the transmission error is condition (B), the idle period of 2 ms must pass before the MAC layer program is able to transmit again. But this may cause the transmission rate to go down, because the MAC layer program must inform the upper layer processing module 104 of the transmission error, and then it must transmit again.

When the primary cause of the transmission error is condition (A), the MAC layer program is not able to transmit again until the next period of time to measure. Moreover, the upper layer processing module 104 is not able to know the time when the next period of time to measure will come.

When the primary cause of the transmission error is condition (C), the upper layer processing module 104 doesn't know how to process after the transmission error, because the upper layer processing module 104 doesn't know the cause for the transmission error.

SUMMARY

A radio transmission device capable of transmitting efficiently under the standard of measures, regulations, and acts for transmission is disclosed.

The radio transmission device may comprise a stop condition assessment module and a stop reason reporting module. The stop condition assessment module may, in response to an occurrence of a transmission stop condition, determine a type of the transmission stop condition (e.g., whether (A), (B) or (C)). The stop reason reporting module may send information to an upper layer processing module that relates to the transmission stop, where the information includes the type of the transmission stop condition.

After receiving the information, the upper layer processing module may utilize the information in requesting frames. In this way, the radio transmission device may transmit effectively under the regulations of transmission.

DETAILED DESCRIPTION

Figure 1:
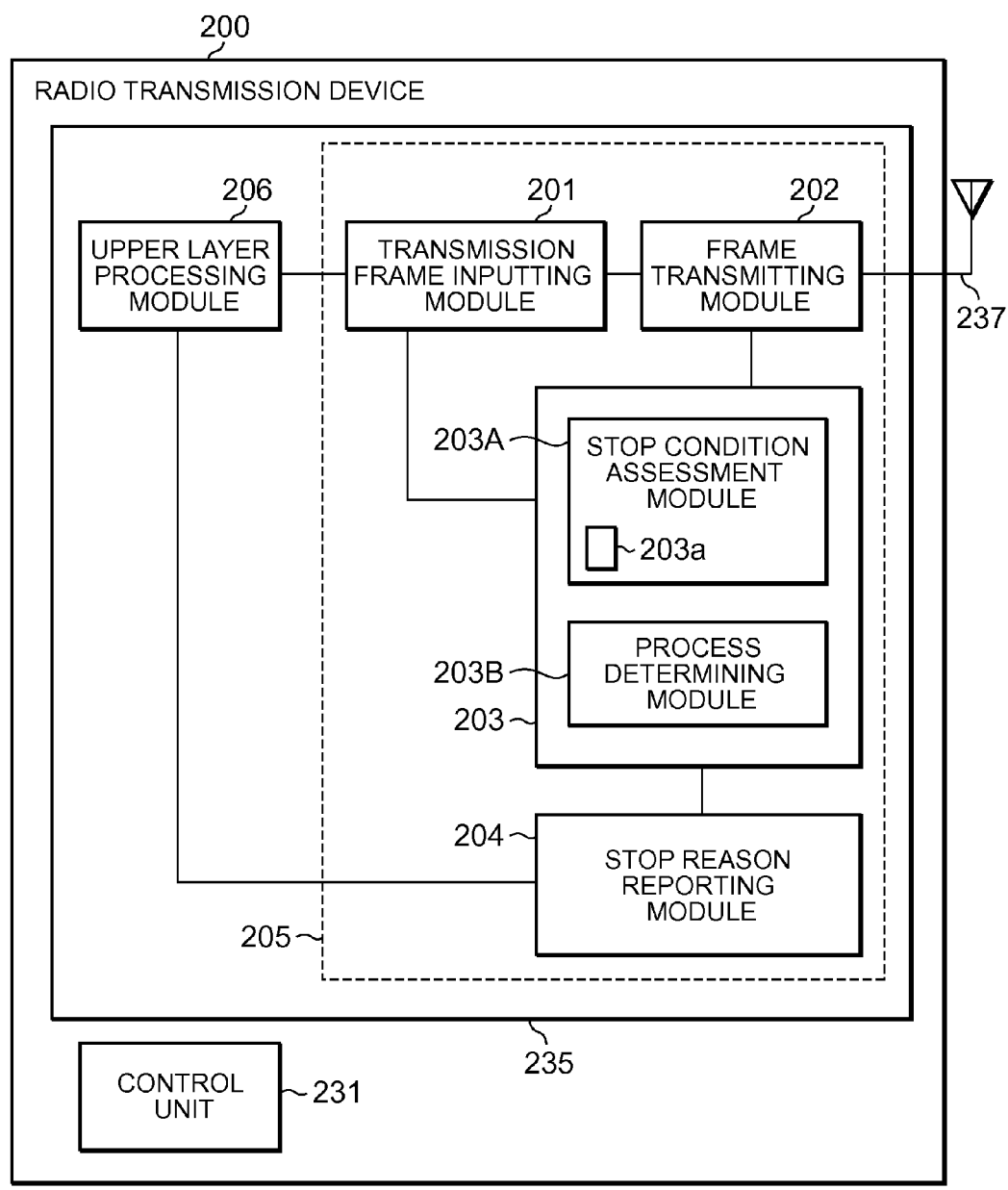
FIG. 1 is a schematic block diagram showing the composition of a radio transmission device according to a first illustrative embodiment.

Embodiments of the radio transmission device will be described with reference to FIGS. 1 to 2 of the drawings, in which like elements are indicated by like reference characters. In the drawings, configurations, positional relations, dimensions, and alignments of elements of the device are illustrated generally for understanding the embodiments and are only intended to facilitate understanding. Described materials and numerical values are merely exemplary. In the drawings, common elements of structures may be designated by the same reference characters, and an explanation thereof is occasionally omitted. Accordingly, embodiments are in no way limited to those illustrated.

Configuration of the Radio Transmission Device in the First Embodiment

The functional configuration of a first embodiment of the radio transmission device 200 is shown FIG. 1. Part of the elements of the radio transmission device 200 in FIG. 1 may be achieved by a CPU (Central Processing Unit) and one or more computer programs that are able to be processed by the CPU. The computer program(s) may be stored in a storage unit of the radio transmission device. Other implementations are possible, such as pure hardware implementations (e.g., specialized or application specific integrated circuits configured with logic to perform particular operations), or combinations of hardware and software and/or firmware.

The radio transmission device 200 in FIG. 1 may include a transmission frame inputting module 201, a frame transmitting module 202, a stop condition processing module 203, a stop reason reporting module 204, an upper layer processing module 206, and a control unit 231. The stop condition processing module 203 and the stop reason reporting module 204 may be part of a lower layer processing module 205, which is associated with the MAC layer and PHY layer. The radio transmission device 200 may include a storage unit 235 which stores the computer program(s), related or other information, and so on. For example, in embodiments where modules 201-206 are implemented as computer programs, the storage unit 235 may store the modules 201-206 and data (e.g., historical information 203a discussed in more detail further on) used by the modules 201-206. The storage unit 235 may be configured using a hard disk (HDD), a Read Only Memory (ROM), a Random Access Memory (RAM) or an Erasable Programmable Read Only Memory (EEPROM). In other words, any of the operations or functions discussed herein may be implemented on Non-Transitory Computer-Readable Media. The control unit 231 may oversee functions of the radio transmission device 200. For example, the control unit 231 may include a CPU and a memory to execute the modules 201-206, and may access the storage unit 235 (e.g., read and/or write to) in the course of executing the modules 201-206.

On the other hand, in embodiments where one or more of the modules 201-206, or parts thereof, is/are or include(s) a separate hardware device(s) such as an integrated circuit(s) configured with logic to perform operations of a corresponding module 201-206, the storage unit 235 may be internal to one or more of the units 201-206, or may be external to one or more of the modules 201-206, and accessed to perform the various operations of the modules 201-206. The modules 201-206 may operate under the control of the control unit 231.

The transmission frame inputting module 201 may receive transmission frames or transmission results from the upper layer processing module 206, and the transmission frame inputting module 201 may input transmission frames or transmission results to the upper layer processing module 206. In addition, the transmission frame inputting module 201 may supply information about a frame to the stop condition processing module 203 to determine whether a stop condition has occurred.

The transmission frame inputting module 201 may perform processing according to instructions of the stop condition processing module 203. The information about the frame to determine whether the stop condition has occurred is referred to by (1), (2), (3), and (4), and so on, in the following. The information may include, for example (1) the frame itself; (2) a length of the frame; (3) a time for transmitting the frame (e.g. expressed as a length of the frame divided by transmission rate); and (4) a maximum period of radio emissions during the time for transmitting. When the information about the frame includes (1) and (2), the stop condition processing module 203 may transform the information for determining the stop condition into information about time.

The frame transmitting module 202 may send frames that are supplied by the transmission frame inputting module 201. The radio transmission device 200 may conduct radio transmission under the standard of measures, regulations, and acts (e.g. ARIB STD-T108). Transmission protocols that may be used by the radio transmission device 200 include, e.g., IEEE 802.15.4g, IEEE 802.11 (Wi-Fi: Wireless Fidelity), and "Zig Bee" (registered trademark), and so on. Referring to FIG. 1, the frame transmitting module 202 may be connected to an antenna 237, by which radio waves are emitted into the air.

Referring to FIG. 1, the stop condition assessment module 203A may be a component which determines, based at least partly on the information about a frame that is about to be sent, whether any of the conditions (A), (B) or (C) described previously is met. In response to any of the conditions (A), (B) or (C) being met, the stop condition assessment module 203A may further determine (e.g., identify) the type of condition that was met (e.g., whether (A), (B) or (C)). The stop condition assessment module 203A may further determine (e.g., identify) a channel corresponding to the condition that was met or occurred. The stop condition assessment module 203A may supply the identified type and the identified channel to the stop reason reporting module 204. The stop reason reporting module 204 may report information, including the type and the channel, to the upper layer processing module 206.

The stop condition assessment module 203A may further determine time information associated with the transmission stop condition that was met, and provide the time information to the stop reason reporting module 204. The stop reason reporting module may include the time information in the information reported to the upper layer processing module 206. The time information may include, for example, an amount of time that a frame to be transmitted is to be delayed.

The process determining module 203B may determine how to carry out a process corresponding to the met condition.

The upper layer processing module 206 may conduct a process which is needed at the network layer and application layer. The upper layer processing module 206 may request the transmission frame inputting module 201 to transmit data (e.g., a frame), and supply a transmission frame to the transmission frame inputting module 201. The upper layer processing module 206 may receive a result of the request from the transmission frame inputting module 201. The upper layer processing module 206 may further receive the information (also referred to herein as a "stopping reason") including the type of transmission stop condition and the corresponding channel, and the time information, from the stop reason reporting module 204, and utilize the received stopping reason in a request to the transmission frame inputting module 201 to input the frame to the frame transmitting module 202.

The control unit 231 may be or include a CPU (Central Processing Unit), for example, or may be or include any other kind of logic circuit, such as an ASIC (Application Specific Integrated Circuit). The control unit 231 may control both the lower layer processing module 205 and the upper layer processing module 206. The control unit 231 may control processing of the radio transmission device 200, which will be described below.

Processing of the Radio Transmission Device

If the radio transmission device 200 has a frame to be transmitted, the transmission frame inputting module 201 may receive a request for inputting the frame from the upper layer processing module 206, and based on the request, the transmission frame inputting module 201 may be provided with the frame by the upper layer processing module 206. Based on the request, the information about the frame to determine whether one of the conditions of stopping transmission is met may be provided by the transmission frame inputting module 201 to the stop condition processing module 203.

Based on the information, the stop condition assessment module 203A may determine which of the conditions, (A) (cumulative permitted transmission period per unit time would be exceeded), (B) (idle period required) or (C) (maximum permitted continuous transmission period would be exceeded) is met.

Condition (C) is the condition which causes transmission of a frame to be stopped or inhibited (e.g., delayed) if a continuous (e.g., uninterrupted) period of time that is taken to transmit a requested frame has consumed (e.g., used up) a maximum permitted period of time. The period of time for transmission may be expressed as a length of frame divided by transmission rate. For example, the maximum permitted continuous period may be approximately 200 ms when (1) the channel width is 400 kHz (kilohertz), and approximately 100 ms when (2) the channel width is 600 kHz to 1000 kHz. When the radio transmission device 200 is able to accept either (1) or (2), the maximum permitted continuous period may be set (e.g., programmed into or otherwise caused to be applied) in the stop condition assessment module 203A. By comparing the period of time used for transmission with the maximum permitted continuous period, it may be determined whether condition (C) is met. The channel width may be the bandwidth per channel.

Condition (A) is the condition which causes transmission of the frame to be stopped or inhibited (e.g., delayed) if transmission of the frame would cause the total accumulated time used by a transmitter in a unit of time (e.g., an hour) to exceed a predetermined limit (e.g., 360 seconds). The stop condition assessment module 203A may include (e.g., store) or access (e.g., read and/or write) historical information 203*a* that includes each of time periods used for transmissions by a given transmitter during a previous hour as measured from a current time. For example, for each transmission by the given transmitter, a transmission time period used and a corresponding transmission completion time may be memorized (e.g., recorded) as the historical information 203*a*. Memorized pairs of transmission time period used/corresponding transmission completion time older than one hour may be deleted. To determine whether condition (A) is met, the transmission time needed to send a frame associated with a current request by the given transmitter may be added to the accumulated transmitting time for the given transmitter for the past hour, and the result may be compared with the value of 360 seconds.

Condition (B) is the condition which causes transmission of a frame by a given transmitter to be stopped or inhibited (e.g., delayed) until an idle or wait period passes, if the time used for the previous transmission by the transmitted exceeded a predetermined time period. For example, the predetermined period may be approximately 3 ms when (a) the channel width is 400 kHz, and may be approximately 2 ms when (b) the channel width is 600 kHz to 1000 kHz. If the radio transmission device 200 is able to accept either (a) or (b), the predetermined time period may be set (e.g., programmed into or otherwise caused to be applied) in the stop condition assessment module 203A. By comparing a transmission time used by a given transmission (information which may be stored in historical information 203*a*) with the predetermined time period, it may be determined whether condition (B) is met.

It may be determined whether a condition is met or not in the order of: (1) condition (C); (2) condition (A); and (3) condition (B). One reason for this order is that if condition (C) is met, it need not be determined whether conditions (A) or (B) are met. Similarly, if condition (A) is met, it need not be determined whether condition (B) is met. Finally, if condition (B) is not met, the stop condition assessment module 203A may permit the transmission frame inputting module 201 to input a requested frame.

If any one of the three conditions (A), (B) or (C) is met, the process determining module 203B may determine which of a plurality of processes to carry out based on the met condition.

If condition (C) is met, it may be determined to stop (e.g., delay) transmitting a frame by the process determining module 203B. Based on the determination, the process determining module 203B may instruct the transmission frame inputting module 201 to stop inputting of the frame. In response, the transmission frame inputting module 201 may send a transmission result indicating that transmission was stopped, such as the message "unable to transmit," to the upper layer processing module 206, without inputting the frame that is requested for transmission to the frame transmitting module 202.

The transmission frame inputting module 201, which may be controlled by the process determining module 203B, may carry out any of the following processes based on instructions from the processing determining module 203B: (i) a process that inputs a requested frame to the frame transmitting module 202 substantially immediately (e.g., without stopping, delaying or inhibiting the requested frame); (ii) a process that delays inputting a requested frame to the frame transmitting module 202; or (iii) a process that stops or inhibits (e.g., cancels altogether) inputting of a requested frame requested to the frame transmitting module 202. A delay according to a category (ii) process may be regarded as corresponding to how long the radio transmission device 200 waits for a transmission stop condition to cease to be in effect.

As described above, the transmission frame inputting module 201, under the control of the process determining module 203B, may carry out a category (ii) process, that is, a process that delays sending a requested frame to the frame transmitting module 202, based on a determination that condition (A) is met. More specifically, based on a determination that condition (A) is met, the process determining module 203B may determine a delay time that must elapse before the requested frame can be sent. To determine the delay time, the process determining module 203B may perform calculations based on information stored in the historical information 203a, and based on a one-hour time window extending from a current time into the past one hour. The information stored in the historical information 203a may include, for example, the transmission time period used (e.g., quantity of time used for a given transmission) and corresponding transmission completion time (e.g., time of day that the given transmission completed) pairs described previously. These value pairs may be stored for each of frame(s) associated with a given transmitter.

The process determining module 203B may, for example, sum selected ones of the value pairs corresponding to a given transmitter and within the time window, to determine a new total transmission period of time per hour. Information about the requested frame, such as the time needed to transmit the requested frame, may be included in the determination of the new total transmission period of time per hour. The process determining module 203B may compare the new total transmission period of time per hour with the total permitted cumulative transmitting time per hour threshold (e.g., 360 seconds) to determine whether the given transmitter can transmit the requested frame while staying below the threshold. If not, the process determining module 203B may calculate a delay time that must elapse before the requested frame can be sent. The process determining module 203B may use the transmission time period used/corresponding transmission completion time value pairs and the information about the requested frame to calculate the delay time.

If a delay is needed, the process determining module 203B may inform the transmission frame inputting module 201 of the delay time. The transmission frame inputting module 201 may input the requested frame to the frame transmitting module 202 after the delay time has passed, and the frame transmitting module 202 may send the frame. Note that the foregoing corresponds to a category (ii) process as described previously. After the transmission has completed, the frame transmitting module 202 may so inform the transmission frame inputting module 201. The transmission frame inputting module 201 may convey the transmission result for the requested frame to the upper layer processing module 206.

Operations associated with the category (ii) process may not be limited to particular units of the radio transmission device 200, but may instead be shared or spread among modules. For example, the transmission frame inputting module 201 may perform calculations associated with the category (ii) process, instead of the process determining module 203B.

If calculations associated with the category (ii) process determine that the new total transmission period of time per hour is more than a threshold value (e.g. 360 seconds), the process determining module 203B may determine not to delay transmitting a frame, but instead, to cancel transmitting a frame. This may prevent an inordinately long transmission delay.

As described above, the process determining module 203B may calculate a total transmission period of time for the past hour. On the other hand, the process determining module 203B may make a time schedule based on specified (e.g., hour-long) periods or intervals, without relation to the current time. The process determining module 203B may calculate a total transmission period of time for a given transmitter based upon the time schedule. In this case, when a next period in the time schedule begins, the previous calculated total transmission period of time may be cleared. Moreover, the process determining module 203B may make a time schedule based on periods or intervals less than an hour long (e.g. half an hour long). If the process determining module 203B made a time schedule based on half-hour periods, for example, the total permitted cumulative transmission period of time per given transmitter would be, for example, 180 seconds rather than 360 seconds.

To determine whether condition (B) is met, the process determining module 203B may calculate a clock time (e.g., time of day) when a transmission by a given transmitter completes. If an elapsed time from a start time of the transmission to the completion time of the transmission is greater than a predetermined time period, a delay time (e.g., idle period) may be required before a next transmission by the transmitter. The process determining module 203B may inform the transmission frame inputting module 201 of the clock time when the transmission completed, and instruct the transmission frame inputting module 201 to delay further transmission by the same transmitter for the delay time. The transmission frame inputting module 201 may input the requested frame to the frame transmitting module 202 after the delay time has passed. The foregoing is another example of a category (ii) process. After a transmission that includes the delay time is completed, the frame transmitting module 202 may so inform the transmission frame inputting module 201. The transmission frame inputting module 201 may convey to the upper layer processing module 206 a transmission result for the requested frame.

The process determining module 203B may permit transmission of a frame by sending the CTS (Clear To Send) to the transmission frame inputting module 201 after the delay time has passed. That is, the process may be simplified because, even if the transmission frame inputting module 201 carries out a category (ii) process, the transmission frame inputting module 201 is able to wait for the CTS, which is used in general transmission protocol.

If none of conditions (A), (B) or (C) is met, the process determining module 203B may send the CTS to the transmission frame inputting module 201 substantially immediately (e.g., without delay). In response, the transmission frame inputting module 201 may input the requested frame to the frame transmitting module 202, and the frame transmitting module 202 may send it to a destination. After the transmission completes, the frame transmitting module 202 may so inform the transmission frame inputting module 201, and the transmission frame inputting module 201 may convey to the upper layer processing module 206 a transmission result.

The historical information 203a may record information relevant to transmissions carried out by the frame transmitting module 202.

Based on any of conditions (A), (B) or (C) being met, the stop reason reporting module 204 may send the stopping reason, including the type of condition met (e.g., whether a transmission was stopped or delayed due to condition (A) being met, condition (B) being met, or condition (C) being met) to the upper layer processing module 206. Additionally, the stop reason reporting module 204 may report a channel corresponding to the met condition to the upper layer processing module 206.

In some embodiments, if condition (B) is met, the stop reason reporting module 204 may not send the stopping reason, due to the delay time (e.g., idle or wait period described above) following transmission completion typically being very short. Alternatively, the stop reason reporting module 204 may report to the upper layer processing module 206 only a selected, limited portion of the stopping reason, and not report any other information.

If condition (C) is met, the stop reason reporting module 204 may send the stopping reason (e.g., as an error code) to the upper layer processing module 206. The stopping reason may include information specifying a time period (e.g., amount or interval of time) beyond the maximum permitted continuous period that is required to complete transmission. For example, the required completion time period may be a parameter included along with the error code. The upper layer processing module 206 may divide data of a stopped or delayed frame into parts, restructure the parts for frames, and request transmission corresponding to each the frames, based upon the required completion time period parameter.

If condition (A) is met, the stop reason reporting module 204 may send the stopping reason (e.g., as an error code) to the upper layer processing module 206. The stopping reason may include information specifying the delay or wait time, which may be determined as described above. For example, the delay time may be a parameter included along with the error code. As described above, the process determining module 203B may compare the delay time with a threshold value, and if the delay time is over the threshold value, the process determining module 203B may determine to cancel transmitting a frame, rather than delaying it. In this case, the stop reason reporting module 204 may change the stopping reason depending on whether the delay time is over the threshold value or not. If the transmitting of a frame is canceled due to condition (A) being met, the upper layer processing module 206 may re-request transmitting of the canceled frame based upon a time management function in the radio transmission device 200. The time management function may be included in the process determining module 203B or the control unit 231, for example.

As will be appreciated from the foregoing description, although conditions (A), (B) and (C) may occur, the radio transmission device 200 is able to conduct radio transmission under the standard of measures, regulations, and acts, and is able to transmit frames effectively by selecting the appropriate corresponding process to execute.

Moreover, as a result of receiving the information describing the stopping condition, and any associated parameters, the upper layer processing module 206 is better able to manage transmission.

Configuration of the Radio Transmission Device in the Second Embodiment

Figure 2:
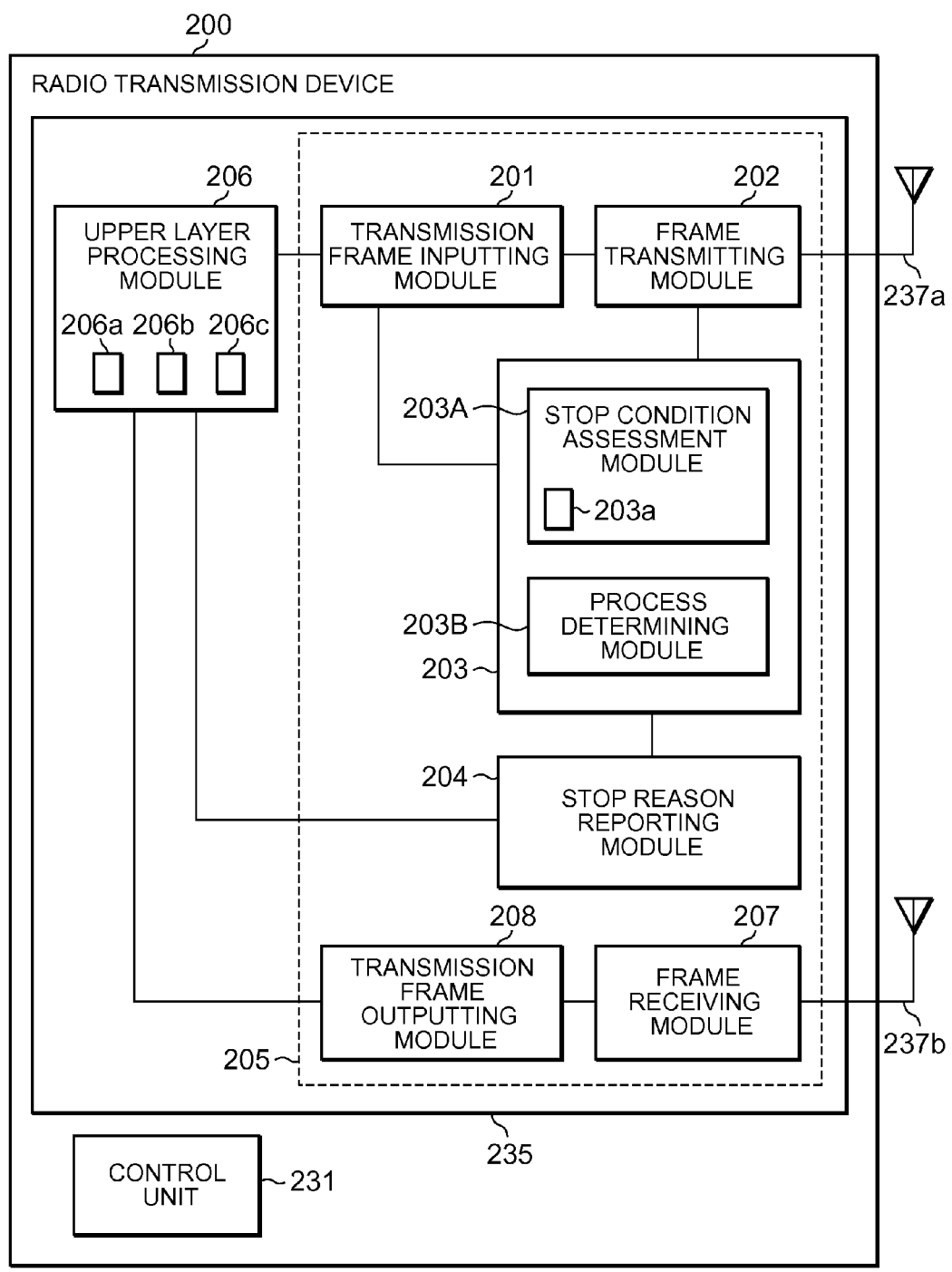
FIG. 2 is a schematic block diagram showing the composition of a radio transmission device according to a second illustrative embodiment.
Figure 3:
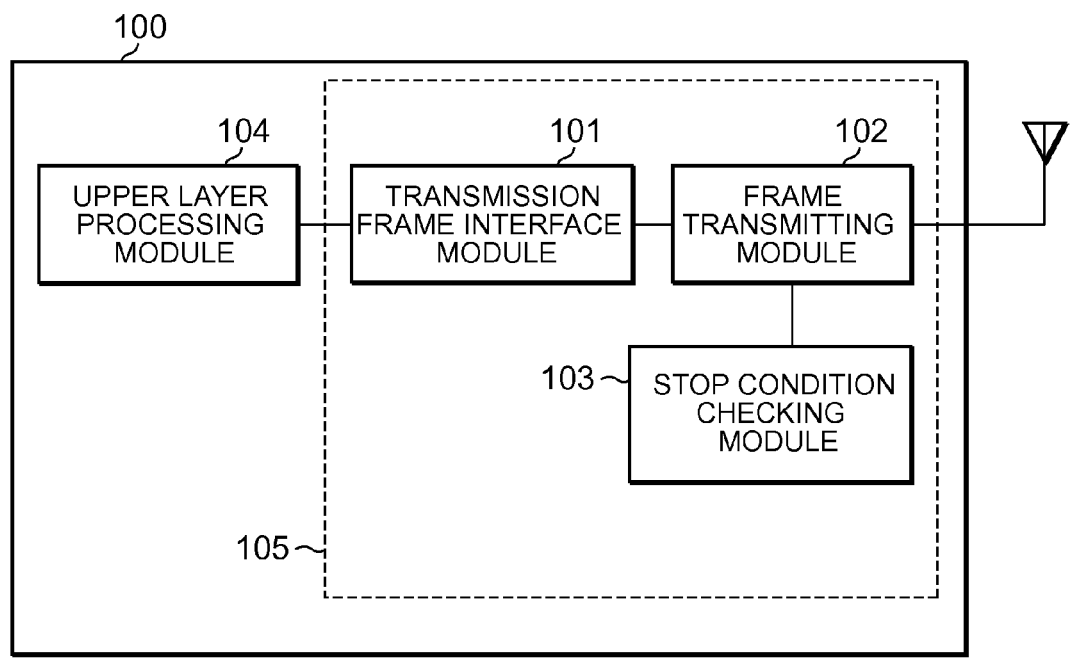
FIG. 3 is a schematic block diagram showing an illustrative related art composition of a radio transmission device.

The functional configuration of a second embodiment of the radio transmission device is shown FIG. 2. The second embodiment of the radio transmission device will be described with reference to both FIGS. 1 and 2 of the drawings, in which like elements are indicated by like reference characters. The radio transmission device may be connected to a multi-hop network.

The radio transmission device 200A in FIG. 2 may include a transmission frame inputting module 201, a frame transmitting module 202, a stop condition processing module 203, a stop reason reporting module 204, an upper layer processing module 206, a frame receiving module 207, a transmission frame outputting module 208, and a control unit 231. The frame transmitting module 202 may be connected to an antenna 237a, by which radio waves are emitted into the air. The frame receiving module 207 may be connected to an antenna 237b, by which radio waves are received from the air. The upper layer processing module 206 may include a channel quality table 206a, a routing decision module 206b, and a quality control module 206c. The quality control module 206c may provide quality of transmission information, based on time information associated with transmission stop conditions, that may be used by the routing decision module 206b in making routing decisions. A radio transmission channel of each of other radio transmission devices 200A in a given area (e.g., a neighboring region) may be recorded in the channel quality table 206a. The upper layer processing module 206 may include software. Similarly to the embodiment of FIG. 1, modules 201-208 of FIG. 2 may be implemented as computer programs, where the storage unit 235 may store the modules 201-208 and data used by the modules 201-208. The control unit 231 may include a CPU and a memory to execute the modules 201-208, and may access the storage unit 235 (e.g., read and/or write to) in the course of executing the modules 201-208.

Alternatively, one or more of the modules 201-208, or parts thereof, may be or include a separate hardware device(s) such as an integrated circuit(s) configured with logic to perform operations of a corresponding modules 201-208 under the control of the control unit 231, where the storage unit 235 may be internal to one or more of the modules 201-208, or may be external to one or more of the modules 201-208, and accessed to perform the various operations of the modules 201-208.

The stop condition assessment module 203A may further determine time information associated with the transmission stop condition that was met, and include the time information in the information reported to the upper layer processing module 206.

Generally, in the protocol of the multi-hop network, quality of transmission is measured among nodes (e.g., a plurality of connected or communicating radio transmission devices 200A) in a given area, and a routing of a frame is determined depending upon a result of a quality of transmission.

The radio transmission device 200A may transmit information that includes a stopping reason presented by the stop reason reporting module 204 to other radio transmission devices 200A (e.g., nodes) in the area. The information may be utilized to determine the quality of transmission. A radio transmission device 200A that receives the information may update the channel quality table 206a with the information, so that the information can be used as quality of transmission criteria by the routing decision module 206b in routing of frames. The quality control module 206c may be the component responsible for sending the quality of transmission information to the other nodes in the area, and for updating the channel quality table 206a.

If none of conditions (A), (B) or (C) is met, the process determining module 203B may send the CTS to the transmission frame inputting module 201, and the process determining module 203B may calculate a remaining transmitting time which indicates how much longer the radio transmission device 200A is permitted to transmit within the total permitted cumulative transmission period. The remaining transmitting time may be calculated, for example, as the difference between: 360 seconds; and the accumulated transmitting time per hour for a given transmitter after adding the transmission time that is requested for a frame(s) at a current time. The stop reason reporting module 204 may send information including the calculated remaining transmitting time to the upper layer processing module 206.

If condition (A) is met, and the process determining module 203B determines a delay time that is less than 360 seconds, the stop reason reporting module 204 may report the delay time to the upper layer processing module 206 before transmitting a frame after the delay time has passed. If the process determining module 203B makes a time schedule based on periods (e.g., hour-long periods) without relation to the current time, and calculates the total accumulated transmission period of time per transmitter based upon the time schedule, the stop reason reporting module 204 may inform the upper layer processing module 206 of a resetting time based on the accumulated transmission time being reset. The resetting time may be the time until the accumulated transmission time is reset to go next period.

The remaining transmitting time, the delay time, or the resetting time may be utilized by a control channel. For example, in response to a request for a frame from the upper layer processing module 206, the transmission frame inputting module 201 may process multicast frames of control channel utilizing the remaining transmitting time, the delay time, or the resetting time, because the control channel is not restricted by conditions (A), (B) or (C).

The frame receiving module 207 is a component which may receive not only normal frames but also frames of control channel. The received frames of control channel may be transmitted to the upper layer processing module 206 via the transmission frame outputting module 208.

If a frame of control channel that utilizes at least one of the remaining transmitting time, the delay time, or the resetting time is processed in the upper layer processing module 206, the quality control module 206c may update records in the channel quality table 206a that include time information for a source radio transmission device to further include time information relating to the processed frame of control channel. The time information stored in the quality table 206a may further include the remaining transmitting time, the delay time, and the resetting time, for use in quality of transmission determinations.

The records of the channel quality table 206a may further include a field indicating various qualities of transmission, and include another field indicating an estimated quality value that is obtained based on a sampling of real values of quality of transmission. The real values of quality of transmission may be indicated by, for example, the RSSI (Received Signal Strength Indicator) values. The estimated quality value may be calculated as a weighted value of the real value of the quality of transmission or a ranked value based on the real value. The ranked value may indicate ranks depending on the real value, for example, five ranks (rank (1) to rank (5)). Rank (5) may be the highest rank. As the remaining transmitting time increases, the ranked value may increase correspondingly. Similarly, as the delay time or the resetting time decreases, the ranked value may increase correspondingly.

The quality control module 206c may update the delay time or the resetting time after shortening the delay time or the resetting time by a predetermined cycle calculated based upon a timer in the upper layer processing module 206, without receiving the frame of control channel.

The routing decision module 206b is a component which may determine the transmission channel (or transmission path) of frames which a radio transmission device 200A, provided with the routing decision module 206b, sends while acting as a source or a relay. The routing decision module 206b may determine the transmission channel utilizing generally known routing techniques. For example, one known routing technique is to determine the transmission channel taking into account the quality of transmission among radio transmission devices 200A in a given area, so as to relay via radio transmission devices 200A having a preferred quality of transmission.

According to the second embodiment, the routing decision module 206b may estimate the quality of transmission and assign the ranking values, associated with the remaining transmitting time, the delay time and the resetting time, described previously. More particularly, the routing decision module 206b may assign a higher estimate to the quality of transmission for a longer remaining transmitting time than for a shorter remaining transmitting time. Further, the routing decision module 206b may assign a higher estimate to the quality of transmission for a shorter delay time than for a longer delay time. Moreover, the routing decision module 206b may assign a higher estimate to the quality of transmission for a shorter resetting time than for a longer resetting time.

In view of the foregoing, according to the second embodiment, in addition to the capabilities of the first embodiment, the radio transmission device 200A may further include the capability to estimate and send time information associated with quality of transmission to other radio transmission devices 200A in a given area, so that the radio transmission devices 200A are able to perform routing more properly and/or efficiently.

Other Embodiments

The radio transmission device 200A may broadcast, as quality of transmission information, time information and/or any conditions of transmission (such as conditions (A), (B) and (C) described above).

A specified device in a network control system may accomplish unified control to determine a routing of all of the radio transmission devices 200A, and report a destination node of the routing after the determining. In this case, the radio transmission devices 200A may communicate with the specified device without broadcasting.

The conditions of transmission are not limited to conditions (A), (B) and (C) discussed above. For example, there may be more or fewer than the latter three conditions. More specifically, when an available channel is 400 kHz in the IEEE 802.15.4g, a transmission rate is 100 kbps (kilo bits per second), and a frame size is less than or equal to 2 Kilo Byte (KB). In this case, condition (C) would be omitted from the conditions of transmission, because a continuous transmitting time of over 200 ms is not possible.

Moreover, the order of determining whether a condition of transmission is met is not limited to the order described above.

Both a lower layer processing module and an upper layer processing module may be provided in one radio transmission device. However, the radio transmission devices described herein are not limited to any particular configuration. For example, a lower layer processing module may be provided one radio transmission device, and an upper layer processing module may be provided another radio transmission device. In more detail, a PC (Personal Computer), for instance, corresponding to an upper layer processing module, may be connected to a wireless adaptor or card corresponding to a lower layer processing module. In embodiments, a radio transmission device may indicate whether it includes either a lower layer processing module, an upper layer processing module, or both.

Moreover, the foregoing has included description of: (1) processes corresponding to a met condition of transmission; and (2) providing information about a met condition of transmission to the upper layer processing module. However, embodiments of the radio transmission device are not limited in this respect. For example, a radio transmission device may carry out (1), or (2), or both (1) and (2).

A radio transmission device may transmit in the 920 MHz band. But of course, the radio transmission device may transmit in the other bands under the standard of measures, and so on.

The radio transmission device 200 or 200A may include the units 201-208 where each be separate hardware devices, such as an IC chip.

While the foregoing has particularly shown and described with reference to certain specific embodiments, it will be understood by those skilled in the art that the foregoing and other changes in form and details can be made therein without departing from the spirit and scope of the appended claims.

What is claimed is:

1. A radio transmission device, comprising:
   a stop condition assessment module;
   a stop reason reporting module; and
   a control unit configured to at least partly control operations of the radio transmission device;
   wherein
   the stop condition assessment module is configured to, in response to an occurrence of a transmission stop condition, determine a type of the transmission stop condition; and
   the stop reason reporting module is configured to send information relating to the transmission stop condition to an upper layer processing module.

2. The radio transmission device of claim 1, wherein the transmission stop condition includes one of plurality of transmission stop conditions, comprising:
   a condition (A) wherein a cumulative transmission period would be greater than a total permitted cumulative transmission period;
   a condition (B) wherein a transmission period exceeds a predetermined time period; and
   a condition (C) wherein a continuous period of transmission would exceed a maximum permitted continuous transmission period.

3. The radio transmission device of claim 2, wherein
   the stop condition assessment module is further configured to determine time information associated with the transmission stop condition, and
   the stop reason reporting module is further configured to include the time information in the information relating to the transmission stop condition sent to the upper layer processing module.

4. The radio transmission device of claim 3, wherein the time information includes at least one of a delay time or a remaining permitted time for transmission.

5. The radio transmission device of claim 1, further comprising a quality control unit configured to provide quality of transmission information.

6. The radio transmission device of claim 1, further comprising:
   a routing decision module;
   a channel quality table; and
   a quality control module;
   wherein
   the channel quality table includes information relating to a quality of transmission associated with one or more nodes that communicate with the radio transmission device;
   the routing decision unit is configured to use the information relating to the quality of transmission to perform routing; and
   the quality control unit is configured to send the information relating to the quality of transmission to the one or more nodes and to update the channel quality table in response to receiving information relating to a quality of transmission from the one or more nodes.

7. The radio transmission device of claim 2, further comprising:
   a channel quality table that stores quality of transmission information, the quality of transmission information including time information relating to condition (A), wherein
   the time information includes a value of a remaining transmitting time, the value indicating how much longer the radio transmission device is permitted to transmit within the total permitted cumulative transmission period.

8. The radio transmission device of claim 7, further comprising:
   a routing decision unit configured to estimate a quality of transmission, and to assign a higher estimate to the quality of transmission for a longer remaining transmitting time than for a shorter remaining transmitting time.

9. The radio transmission device of claim 2, further comprising:
   a channel quality table that stores quality of transmission information, the quality of transmission information including time information relevant to condition (A), wherein
   the time information includes at least one of a delay time or a resetting time corresponding to how long the radio transmission device waits for condition (A) to cease to be in effect.

10. The radio transmission device of claim 9, further comprising:
    a routing decision unit configured to estimate a quality of transmission, and to assign a higher estimate to the quality of transmission for a shorter delay time than for a longer delay time.

11. The radio transmission device of claim 10, further comprising:
    a routing decision unit configured to estimate a quality of transmission, and to assign a higher estimate to the quality of transmission for a shorter resetting time than for a longer resetting time.

12. The radio transmission device of claim 1, wherein the lower layer processing module further includes:
    a process determining module configured to determine which of a plurality of processes to carry out based on the type of the transmission stop condition, the plurality of processes including
    a first process that delays a transmission until the transmission stop condition is no longer in effect, and
    a second process that cancels a transmission in response to the occurrence of the transmission stop condition.

* * * * *